US010165245B2

(12) United States Patent
Hayes (10) Patent No.: US 10,165,245 B2
(45) Date of Patent: Dec. 25, 2018

(54) PRE-FETCHING VIDEO CONTENT (71) Applicant: Kaltura, Inc., New York, NY (US)

(72) Inventor: Christopher Douglas Hayes, Boulder, CO (US)

(73) Assignee: KALTURA, INC., New York, NY (US)

( * ) Notice: Subject to any disclaimer, the term of this patent is extended or adjusted under 35 U.S.C. 154(b) by 0 days.

(21) Appl. No.: 13/934,446

(22) Filed: Jul. 3, 2013

(65) Prior Publication Data
US 2014/0010519 A1 Jan. 9, 2014

Related U.S. Application Data (60) Provisional application No. 61/813,531, filed on Apr. 18, 2013, provisional application No. 61/668,931, filed on Jul. 6, 2012.

(51) Int. Cl.
*H04N 9/80* (2006.01)
*H04N 9/87* (2006.01)
(Continued)

(52) U.S. Cl.
CPC ......... *H04N 9/87* (2013.01); *G11B 20/10527* (2013.01); *G11B 27/105* (2013.01);
(Continued)

(58) Field of Classification Search
CPC .. H04N 21/8545; H04N 5/76; H04N 21/4331; H04N 21/442; H04N 21/4622;
(Continued)

(56) References Cited

U.S. PATENT DOCUMENTS 5,329,320 A 7/1994 Yifrach et al.
5,524,637 A 6/1996 Erickson
(Continued)

FOREIGN PATENT DOCUMENTS

DE 10053720 4/2002
EP 1033157 9/2000
(Continued)

OTHER PUBLICATIONS

"CD-i or Compact Disc Interactive", Wikipedia, retrieved on Aug. 9, 2011 from URL: http://en.wikipedia.org/wiki/CD-i, 6 pages.
(Continued)

*Primary Examiner* — Helen Shibru
(74) *Attorney, Agent, or Firm* — Dorsey & Whitney LLP (57) ABSTRACT

A computing device plays at least one first video content segment. The video content segment may be a portion of an interactive video content sequence including multiple segments that may each be selected during play of one or more of the other segments. The computing device determines one or more second video content segments that are associated with the first video content segment. Such determination may be made by analyzing information describing an interactive video content sequence of which the video content segment is a part. The computing device attempts to load one or more second video content segments. In this way, play of the video content segments may reduce and/or avoid delays in changing the video content being played.

20 Claims, 6 Drawing Sheets

(51) Int. Cl.
  *H04N 5/76* (2006.01)
  *G11B 20/10* (2006.01)
  *G11B 27/10* (2006.01)
  *H04N 21/433* (2011.01)
  *H04N 21/442* (2011.01)
  *H04N 21/462* (2011.01)
  *H04N 21/472* (2011.01)
  *H04N 21/845* (2011.01)

(52) U.S. Cl.
  CPC .......... *H04N 5/76* (2013.01); *H04N 21/4331* (2013.01); *H04N 21/442* (2013.01); *H04N 21/4622* (2013.01); *H04N 21/47202* (2013.01); *H04N 21/8456* (2013.01)

(58) Field of Classification Search
  CPC ......... H04N 21/47202; H04N 21/8456; G11B 27/031; G11B 20/10527; G11B 27/105
  USPC .................................................. 386/262, 248
  See application file for complete search history.

(56) References Cited

U.S. PATENT DOCUMENTS

| | | | |
|---|---|---|---|
| 5,576,551 A | 11/1996 | Adair | |
| 5,675,752 A | 10/1997 | Scott et al. | |
| 5,676,551 A | 10/1997 | Knight et al. | |
| 5,895,123 A | 4/1999 | Fujii et al. | |
| 6,222,925 B1 | 4/2001 | Shiels et al. | |
| 6,223,211 B1 | 4/2001 | Hamilton et al. | |
| 6,357,047 B1 | 3/2002 | Kurtze et al. | |
| 6,687,454 B1 | 2/2004 | Kuroiwa | |
| 6,975,832 B2 | 12/2005 | Adams et al. | |
| 6,977,673 B1 | 12/2005 | McKain et al. | |
| 7,373,377 B2 | 5/2008 | Altieri | |
| 7,623,754 B1 | 11/2009 | McKain et al. | |
| 7,702,014 B1 | 4/2010 | Kellock et al. | |
| 7,788,583 B1 | 8/2010 | Amzallag et al. | |
| 8,156,520 B2 | 4/2012 | Casagrande et al. | |
| 8,380,049 B2 | 2/2013 | Lang et al. | |
| 8,600,220 B2 * | 12/2013 | Bloch et al. | 386/296 |
| 8,732,180 B2 * | 5/2014 | Lindahl et al. | 707/758 |
| 9,426,509 B2 * | 8/2016 | Ellis | H04H 60/31 |
| 9,431,059 B2 * | 8/2016 | Cai | H04N 5/44513 |
| 2002/0082063 A1 | 6/2002 | Miyaki et al. | |
| 2002/0091455 A1 | 7/2002 | Williams | |
| 2002/0120456 A1 | 8/2002 | Berg et al. | |
| 2002/0154157 A1 | 10/2002 | Sherr et al. | |
| 2003/0169295 A1 | 9/2003 | Becerra, Jr. | |
| 2004/0009813 A1 | 1/2004 | Wind | |
| 2004/0193441 A1 | 9/2004 | Altieri | |
| 2005/0071736 A1 | 3/2005 | Schneider et al. | |
| 2005/0102707 A1 | 5/2005 | Schnitman | |
| 2005/0120389 A1 | 6/2005 | Boss et al. | |
| 2005/0217462 A1 | 10/2005 | Thomson et al. | |
| 2006/0233537 A1 | 10/2006 | Larsen et al. | |
| 2006/0268007 A1 | 11/2006 | Gopalakrishnan | |
| 2007/0020604 A1 | 1/2007 | Chulet et al. | |
| 2007/0112837 A1 | 5/2007 | Houh et al. | |
| 2007/0118801 A1 | 5/2007 | Harshbarger et al. | |
| 2007/0162395 A1 | 7/2007 | Ben-Yaacov et al. | |
| 2007/0162502 A1 * | 7/2007 | Thomas | G06F 17/3082 |
| 2007/0239754 A1 | 10/2007 | Schnitman | |
| 2008/0010585 A1 | 1/2008 | Schneider et al. | |
| 2008/0088735 A1 | 4/2008 | Biniak et al. | |
| 2008/0163089 A1 | 7/2008 | Altieri | |
| 2008/0300967 A1 | 12/2008 | Buckley et al. | |
| 2008/0320531 A1 | 12/2008 | Kim et al. | |
| 2009/0013284 A1 | 1/2009 | Chen | |
| 2009/0022159 A1 | 1/2009 | Coleman et al. | |
| 2009/0172022 A1 | 7/2009 | Bathiche et al. | |
| 2009/0228572 A1 | 9/2009 | Wall et al. | |
| 2009/0327898 A1 | 12/2009 | Kim et al. | |
| 2010/0031149 A1 | 2/2010 | Gentile et al. | |
| 2010/0088735 A1 | 4/2010 | Sadja et al. | |
| 2010/0169786 A1 | 7/2010 | O'Brien et al. | |
| 2010/0186579 A1 | 7/2010 | Schnitman | |
| 2010/0242110 A1 | 9/2010 | Louch et al. | |
| 2010/0293455 A1 | 11/2010 | Bloch | |
| 2010/0332404 A1 | 12/2010 | Valin | |
| 2011/0028213 A1 | 2/2011 | Dusenberry et al. | |
| 2011/0126106 A1 | 5/2011 | Shaul et al. | |
| 2011/0200116 A1 | 8/2011 | Bloch et al. | |
| 2011/0202562 A1 | 8/2011 | Bloch et al. | |
| 2011/0249073 A1 | 10/2011 | Cranfill et al. | |
| 2013/0093832 A1 | 4/2013 | Konda | |
| 2013/0104024 A1 | 4/2013 | Rajkumar et al. | |
| 2013/0259442 A1 | 10/2013 | Bloch et al. | |
| 2014/0019863 A1 | 1/2014 | Callanan | |
| 2014/0026048 A1 | 1/2014 | Spirer et al. | |
| 2014/0026175 A1 | 1/2014 | Callanan | |
| 2014/0033038 A1 | 1/2014 | Callanan | |
| 2014/0078397 A1 | 3/2014 | Bloch et al. | |
| 2014/0082666 A1 | 3/2014 | Bloch et al. | |
| 2014/0178051 A1 | 6/2014 | Bloch et al. | |
| 2014/0304730 A1 * | 10/2014 | Lettau | H04N 5/91 725/32 |
| 2014/0317638 A1 * | 10/2014 | Hayes | G11B 27/005 719/318 |
| 2014/0376883 A1 | 12/2014 | Callanan | |

FOREIGN PATENT DOCUMENTS

| | | |
|---|---|---|
| EP | 2712206 A1 | 3/2014 |
| GB | 2428329 | 1/2007 |
| WO | 2008/052009 | 5/2008 |
| WO | 2010/131244 | 11/2010 |
| WO | 2010131244 A1 | 11/2010 |
| WO | 2012/114329 | 8/2012 |
| WO | 2012/114330 | 8/2012 |
| WO | 2012114330 A1 | 8/2012 |
| WO | 2013/150378 | 10/2013 |

OTHER PUBLICATIONS

"Dragon's Lair", Wikipedia, retrieved on Aug. 9, 2011 from URL: http://en.wikipedia.org/wiki/Dragon%27s_Lair, 11 pages.

"Laserdisc video game", Wikipedia, retrieved on Aug. 9, 2011 from URL: http://en.wikipedia.org/wiki/Laserdisc_video_game, 2 pages.

"YouTube Help—Creating or editing annotations", YouTube, retrieved on Aug. 9, 2011 from URL: http://www.google.com/support/youtube/bin/answer.py?answer=92710&topic=14354, 5 pages.

"EP Supplemental Search Report dated Jun. 28, 2012", EP Application No. 2430631, 2 Pages.

"PCT International Search Report and Written Opinion dated Mar. 8, 2012", PCT Application No. PCT/US2011/056453, filed Oct. 14, 2011, 12 pages.

"PCT International Search Report dated Aug. 25, 2010", PCT Application No. PCT/IL2010/000362, 2 pages.

"US Non-Final Office Action dated Jul. 23, 2012", U.S. Appl. No. 13/034,645, 13 pages.

"Official word from Google", retrieved on Apr. 7, 2014 from URL: https://support.google.com/webmasters/answer/34445?hl=en, 1 page.

"An iFrame test", retrieved on Apr. 7, 2014 from URL: http://www.rimmkaufman.com/blog/do-search-engines-follow-links-in-iframes/31012012/, 11 pages.

http://www.readwritethink.org/classroom-resources/student-interactives/plot-diagram-30040.html, earliest date Feb. 21, 2010.

Final Office Action dated Apr. 10, 2014, for U.S. Appl. No. 13/274,224.

Non-Final Office Action dated Sep. 13, 2013, for U.S. Appl. No. 13/274,224.

Non-Final Office Action dated Sep. 10, 2014, for U.S. Appl. No. 13/934,800.

Non-Final Office Action dated Sep. 10, 2014, for U.S. Appl. No. 13/935,014.

U.S. Non-Final Office Action dated Jan. 12, 2015, U.S. Appl. No. 13/274,224, 4 pages.

U.S. Notice of Allowance and Fee(s) Due dated Jan. 7, 2015, U.S. Appl. No. 13/935,014, 10 pages.

(56) References Cited

OTHER PUBLICATIONS

U.S. Final Office Action dated May 28, 2015, U.S. Appl. No. 13/274,224, 6 pages.
U.S. Final Office Action, U.S. Appl. No. 13/934,800, dated Feb. 27, 2015, 17 pages.
U.S. Non-Final Office Action, U.S. Appl. No. 14/684,055, dated Sep. 2, 2015, 18 pages.

\* cited by examiner

PRE-FETCHING VIDEO CONTENT

CROSS-REFERENCE TO RELATED APPLICATION

The present application claims the benefit under 35 U.S.C. § 119(e) to U.S. Provisional Patent Application No. 61/668,931, which was filed on Jul. 6, 2012, entitled "SYSTEM AND METHOD FOR CREATING AND ANALYZING INTERACTIVE EXPERIENCES" and U.S. Provisional Patent Application No. 61/813,531, which was filed on Apr. 18, 2013, entitled "SYSTEM AND METHOD FOR CREATING AND ANALYZING INTERACTIVE EXPERIENCES," which are both incorporated by reference as if fully disclosed herein.

TECHNICAL FIELD

This disclosure relates generally to video, and more specifically to pre-fetching video content.

BACKGROUND

Modern video players may have frequent and/or noticeable delays when changing the video content being played. In some cases, these delays may be caused by the time required to load new video content onto the computing device executing the video player from another computing device across one or more networks via one or more communication media. In other cases, these delays may be caused by the time required to load new video content into memory or similar storage medium which the video player utilizes to play the new video content from another kind of storage medium, such as a hard drive. Regardless of the cause, these delays may limit the capability of video players for immersion or fluid user interaction. Additionally, such delays may be frustrating for users.

Typically, video players, to date, may not have been particularly concerned with this issue, because they may primarily work with single, static videos and little to no user interaction. However, such delays may be exacerbated in the case of interactive video content sequences that include a number of selectable video content segments. For example, such sequences may include a number of video segments that each may be selected from one or more other segments in the sequence. As the segments may be portions of a larger sequence, delays in presenting a selected segment may cause the sequence to seem less immersive and/or less interactive for users. Additionally, such delays in such interactive video content sequences may be particularly irritating for users.

SUMMARY

The present disclosure discloses systems, methods, apparatuses, and computer program products for pre-fetching video content. At least one first video content segment may be played. One or more second video content segments that are associated with the first video content segment may be determined. Loading of the one or more second video content segments may be attempted. In this way, play of the video content segments may reduce and/or avoid delays in changing the video content being played.

In some implementations, the video content segment may be a portion of an interactive video content sequence including multiple segments that may each be selected during play of one or more of the other segments. In such implementations, determination of associated video content segments may be made by analyzing information describing the interactive video content sequence of which the video content segment is a part. Such information may include description of the structure of the interactive video content sequence, the video content segments that are included in the interactive video content sequence and how they interrelate, sizes and/or estimated load times for the video content segments, and/or any other such information regarding the interactive video content sequence and/or one or more of the video content segments. Additionally, such information may be separate from and/or embedded within one or more of the video content segments.

In various implementations, the number of and/or the particular video content segments that are determined to be associated and/or attempted to be loaded may be determined according to one or more priority schemes. Such priority schemes may be based at least in part on statistical information regarding previous selection of video content segments, available storage media used to store video content segments, sizes of video content segments, estimated load times of video content segments, whether or not video content segments are selectable during play of a currently playing video content segments or during play of video content segments that are selectable during play of currently playing video content segments, and/or other such factors. Additionally, such priority schemes may specify to load particular video content segments before attempting to load other video content segments, to give priority to loading of particular content segments over loading of other video content segments, and so on.

In one or more implementations, when a different video content segment is selected for play, one or more determinations may be made as to whether or not to retain one or more video content segments for which an attempt to load was previously made. Determination not to retain may include releasing storage media for garbage collection, ceasing loading of video content segments, and so on. Such determination of whether or not to retain may be based at least on whether or not video content segments are selectable during play of the different video content segment, whether or not the video content segments are fully loaded, statistical information regarding selection of the video content segments, whether or not available storage for video content segments is below a threshold, and/or other such factors.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

The description that follows includes sample systems, methods, and computer program products that embody various elements of the present disclosure. However, it should be understood that the described disclosure may be practiced in a variety of forms in addition to those described herein.

The present disclosure discloses systems, methods, apparatuses, and computer program products for pre-fetching video content. At least one first video content segment may be played. One or more second video content segments that are associated with the first video content segment may be determined. Loading of the one or more second video content segments may be attempted. In this way, play of the video content segments may reduce and/or avoid delays in changing the video content being played.

In various implementations, the techniques described in the present disclosure may be utilized in a video player that avoids the above described delays and other problems with prior art video players. In one or more implementations, a video player may load a package of multiple videos in the background, while one video is playing for the user, so that when the user makes a selection, the newly selected video may begin playing upon user selection. In this way, the newly selected video may begin playing substantially immediately or otherwise without noticeable delay. Once the newly selected video begins playing, a new package of videos may begin loading in the background, based on new options available to the user, in the newly playing video.

Figure 1:
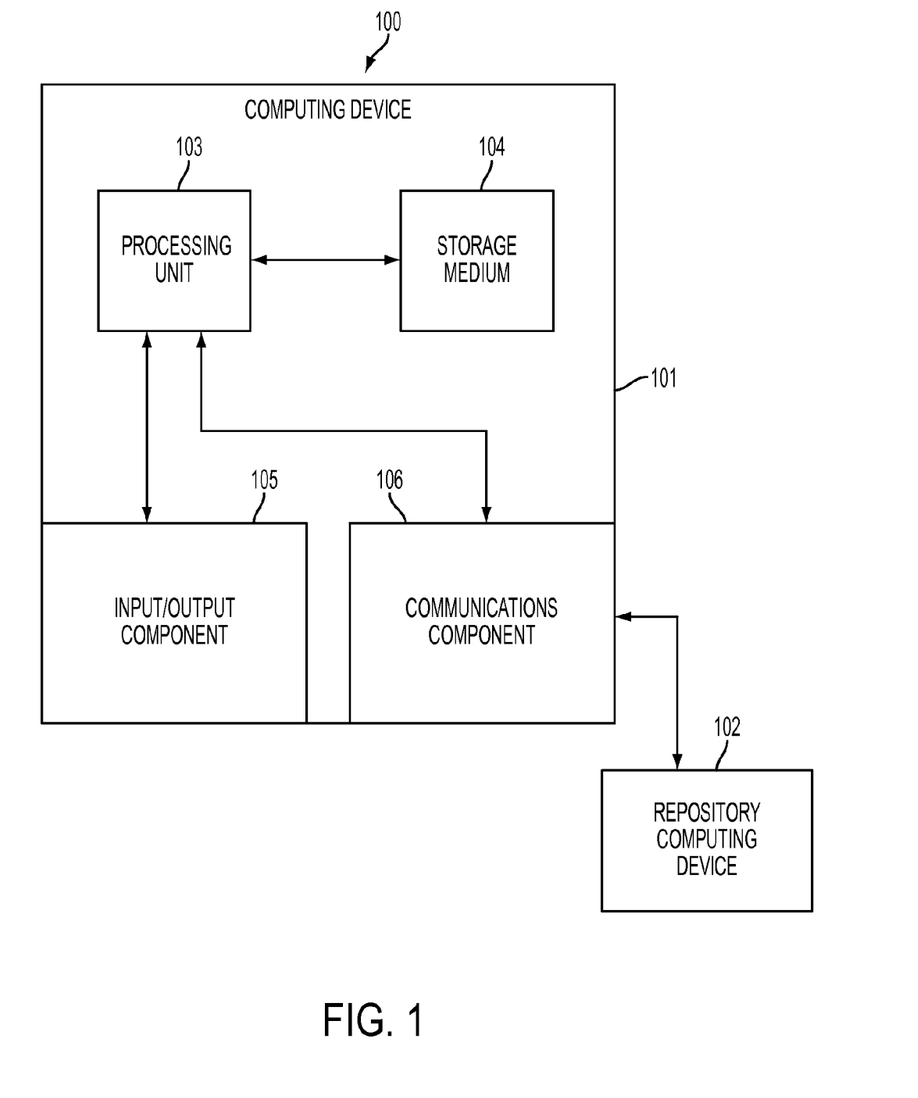
FIG. 1 is a block diagram illustrating a system for pre-fetching video content.

FIG. 1 is a block diagram illustrating a system 100 for pre-fetching video content. The system 100 includes a computing device 101 which may be any kind of computing device such as a laptop computer, a desktop computer, a tablet computer, a mobile computer, a cellular telephone, a smart phone, a server computer, a digital media player, and/or other such computing device.

In some cases, the system 100 may also include one or more repository computing devices 102. The repository computing device may be any kind of computing device (or devices, such as multiple computing devices configured in a cloud computing configuration) that stores video content that may be accessed by the computing device 101 (such as one or more video servers, web servers, and/or any other computing devices that store video content). The repository computing device and computing device may be connected via one or more wired and/or wireless communication media (such as the Internet, Ethernet, Wi-Fi, one or more cellular networks, and so on). As such, the repository computing device may be considered remote from the computing device regardless of their actual individual locations.

The computing device 101 may include one or more processing units 102, one or more one or more non-transitory storage media 104 (which may take the form of, but is not limited to, a magnetic storage medium; optical storage medium; magneto-optical storage medium; read only memory; random access memory; erasable programmable memory; flash memory; and so on), and/or one or more input/output components 105. In some cases, the computing device may also include one or more communication components 106.

The processing unit 102 may execute instructions stored in the storage medium 104 to perform one or more computing device 101 functions. Such functions may include executing one or more video player applications and/or one or more browser applications (such as an Internet browser application) which may execute one or more video player applications. Such functions may also include: playing at least one first video content segment, determining at least one second video content segment is associated with the first video content segment, and attempting to load the at least one second video content segment.

In some cases, the first video content segment and the at least one second video content segment may be part of an interactive video sequence. Such a sequence may be made up of a number of video content sequences, one or more of which may enable selections to play one or more of the other video content segments of the sequence.

Figure 2:
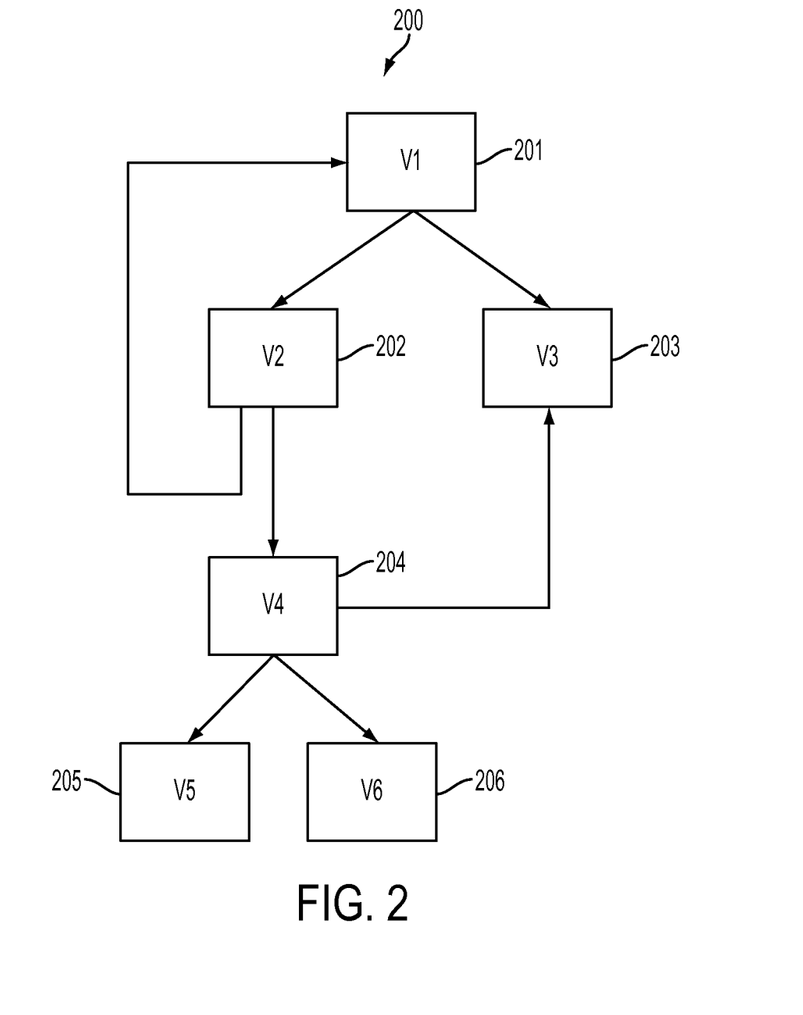
FIG. 2 is a block diagram illustrating the structure of an example interactive video content sequence including a number of selectable video content segments.

FIG. 2 is a block diagram illustrating the structure of an example interactive video content sequence 200 including a number of selectable video content segments 201-206. As illustrated, the sequence may begin with video content segment V1 201. During play of video content segment V1, one or more selections may be enabled (such as by presenting one or more icons that may be selected, visual/audio/other indicators that indicate to press a key on a keyboard or other input device, and/or any other means of indicating a selection) to select either video content segment V2 202 or video content segment V3 203.

Similarly, as illustrated, during play of video content segment V2, one or more selections may be enabled to select either video content segment V1 or video content segment V4 204. Also, as illustrated, during play of video content segment V4, one or more selections may be enabled to select either video content segment V5 205, video content segment V6 206, or video content segment V3. However, as illustrated, selections of other video content segments are not enabled during play of video content segments V5, V6, or V3.

By way of example, video content segment V1 201 may be loaded and played. Loading of a video content segment may include loading a video content segment from a slower, longer term storage medium (such as a hard drive) to a faster, working storage medium (such as memory, cache, and so on) that a video player utilizes to play video content. Loading of a video content segment may also include a computing device (such as the computing device 101) obtaining the video content segment from one or more remote computing devices (such as the repository computing device 102).

During play of the video content segment V1 201, video content segments associated with video content segment V1 may be determined. In some cases, video content segments V2 202 and V3 may be associated with video content segment V1 because they may be selected for play during the play of video content segment V1. In other cases, additional levels of video content segments may be determined to be associated. For example, video content segments V2, V3, and V4 204 may be determined to be associated because V1 and V2 may be selected for play during the play of video content segment V1 and V4 may subsequently be selected if V2 is played. In various implementations, the number of video content segments that may be selected as associated may be dependent on available bandwidth, available storage space in which to load video content segments, the size of the various available and possibly associated video content segments, statistical information regarding previous selection of the available and possibly associated video content segments, and so on.

In one or more implementations, the determination of video content segments associated with video content segment V1 201 may be determined based on information that describes the interactive video content sequence 200. In some cases, the information may be a node based graphical structure such as that illustrated in FIG. 2. However, in other cases the information may be any kind of information structure that describes the interactive video content sequence 200. Such information may include the nodes (i.e., the video content segments), relationships among the nodes (i.e., which nodes may be selected during the play of other nodes), sizes of nodes, estimated load times of nodes, statistics regarding nodes (such as statistics regarding previous selection of particular nodes), and/or any other such information related to the interactive video content sequence 200. In some cases, the information may be embedded in one or more of the video content segments (such as video content V1) and/or stored in a separate data structure (such as one or more files).

After video content segment(s) associated with the video content segment V1 201 are determined, loading of the associated video content segment(s) may be attempted. Attempting to load a video content segment may have one or more different statuses. Such statuses may include fully loaded, currently loading, currently loading not able to begin, currently loading able to begin, currently loading able to complete, waiting to load, and so on.

In some implementations, attempting to load one or more video content segments may be performed according to one or more priority schemes. One such priority scheme may specify to attempt to load one or more of the video content segments before attempting to load one or more other of the video content segments. For example, loading of video content segment V3 203 may be attempted only once loading of video content V2 202 has completed (and/or completed to a particular status such as currently loading able to begin or currently loading able to complete).

Another such priority scheme may specify to give preference to the attempt to load a first of the one or more of the video content segments over the attempt to load one or more other of the video content segments. For example, the attempt to load of video content segment V3 203 may be given preference over the attempt to load of video content V2 202.

Regardless of the priority scheme utilized, in various implementations the application of the priority scheme may be based on a number of different factors. Such factors may include statistics information regarding selection of one or more video content segments, sizes of video content segments, estimated load times of video content segments, and/or any other such factors.

For example, statistical information may indicate that video content segment V3 203 was selected approximately 90% of the time that a video content segment was selected during play of video content segment V1 201. Based on this statistical information, loading of video content segment V2 202 may be attempted only once loading of video content V3 has completed.

By way of another example, a decision may be made as to whether or not to attempt to load multiple levels of video content segments based on video content segment size and/or other factors. In one such example, loading of the video content segment V2 202 and video content segment V3 203 may be attempted during play of video content segment V1 201 as these two video content segments are selectable from video content segment V1. Based on the sizes of the video content segment V2 and/or V3, a determination may be made to attempt to load additional content segments. For example, an attempt to load video content segment V4 204, which is selectable from video content segment V2, may also be made if video content segment V2 is below 500 kilobytes in size but not if V2 is 500 kilobytes in size or greater.

In various implementations, attempting to load one or more video content segments may include reporting false information regarding the load status of one or more video content segments. For example, attempting to load a video content segment may include requesting that a browser application load the video content segment. In some cases, the browser may avoid loading the video content segment even after requested unless play of the video content segment has begun. In such a case, attempting to load the video content segment may include falsely informing the browser application that the video content segment is being played (and/or falsely reporting other such information such as the position of a video play head within the video content segment) in order to force the browser application to attempt to load the video content segment.

In one or more implementations, restrictions may be placed on the number of video content segments that maybe loaded from a particular source at a particular time (such as a video server computer). In such cases when attempting to load video content segments, sources currently being utilized may be tracked and when a video content segment to be loaded is available from more than one source, the attempt to load the video content segment may be made from a second source instead of a first source if more than a certain number (such as four) video content segments are already being loaded form the first source.

During play of video content segment V1 201, video content segment V2 202 may be selected. As such, as video content segment V1 and video content segment V4 204 may be selected from video content segment V2, attempts may be made to load video content segment V1 and V2. In this case, video content segment V1 may already be loaded or partially loaded. If video content segment V1 is already loaded, the previously loaded version may be utilized instead of reloading video content segment V1. If video content segment V1 is partially loaded, loading of video segment V1 may be allowed to continue. In this scenario, video content segment V1 is at least partially loaded, as play of video content V2 was selected during play of video content segment V1. However, if in another scenario loading of video content segment V1 had been attempted but had not even yet partially completed, the attempt to load video content segment V1 may be continued.

Further, upon selection of video content segment V2 202 during play of video content segment V1 201, a determination may be made as to retain one or more video content segments for which an attempt to load had been made. In some cases, determining not to retain a video content segment may include releasing memory and/or other storage media allocated to the video content segment for eventual garbage collection. In various cases, if the video content segment determined not to be retained had not yet been fully loaded, loading of the video content segment may be ceased (such as by signaling a browser or other program/process that is performing the loading).

In some cases, any video content segment for which an attempt to load had been made may be determined to not be retained if that video content segment is not selectable from the video content segment being played. However, in other cases, video content segments not selectable from the currently playing video content segment may be retained if fully loaded and not retained if not yet fully loaded.

For example, video content segment V3 203 is not selectable from video content segment V2. In a scenario where video content segments that are not currently selectable are not retained, a determination not to retain video content segment V3 may be made.

In another example, video content segments that are not currently selectable are retained if fully loaded. In such a scenario, the video content segment V3 may be retained if it is fully loaded. To the contrary, if video content segment V3 is not yet fully loaded, it may not be retained.

In various implementations, determination of whether or not to retain video content segments may depend on a variety of factors. Such factors may include: whether or not the video content segments are selectable from the currently playing video segment, whether or not the video content segments are selectable a video content segment that is selectable from the currently playing video content segment, available storage media for video content segments (such as whether or not available video memory is below a 50% threshold), statistical information regarding how frequently a video content segment has subsequently been selected even though not selectable from the currently playing video, other statistical information, the size of the video content segments, a time and/or estimated time required to load the video content segment, and/or any other such factors.

During play of video content segment V2 202, video content segment V4 204 may be selected. As such, as video content segment V5 205, video content segment V6 206, and video content segment V3 203 may be selected from video content segment V4, attempts may be made to load video content segment V5, video content segment V6, and video content segment V3. In this case, video content segment V3 may already be loaded if it had finished loading and had been retained. If video content segment V3 is already loaded, the previously loaded version may be utilized instead of reloading video content segment V3.

Figure 3:
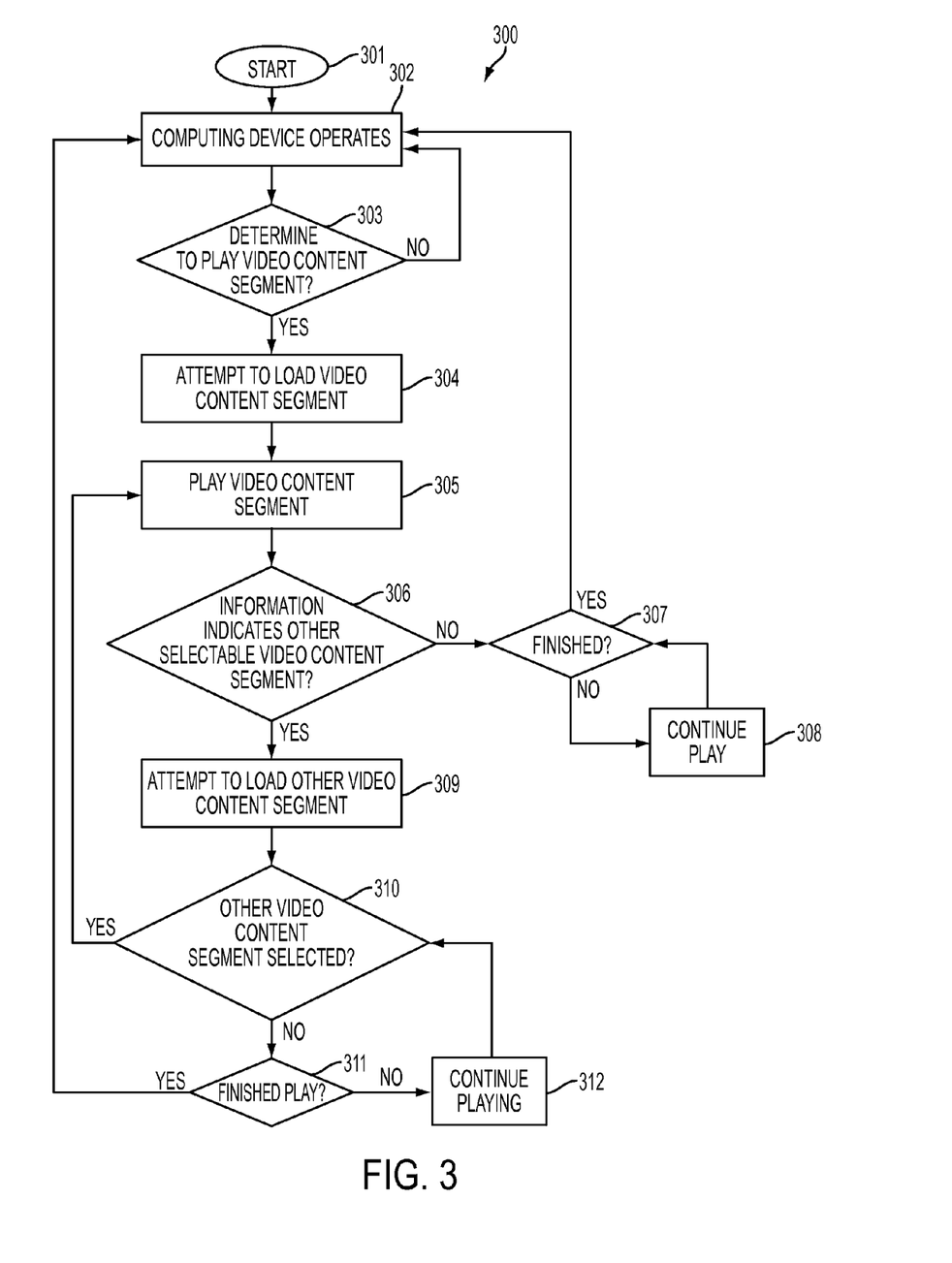
FIG. 3 is a flow chart illustrating a method for pre-fetching video content. This method may be performed by the system of FIG. 1.

FIG. 3 illustrates a method 300 for pre-fetching video content. The method 300 may be performed by the electronic device 101 of FIG. 1. The flow begins at block 301 and proceeds to block 302 where the computing device operates. The flow then proceeds to block 303 where the computing device determines whether or not to play a video content segment. The computing device may determine to play a video content segment based on one or more inputs received from one or more users via one or more input/output devices, in response to one or more instructions issued by one or more executing programs, one or more default choices assumed for one or more users, and so on. If so, the flow proceeds to block 304. Otherwise, the flow returns to block 302 where the computing device continues to operate.

At block 304, an attempt may be made to load the video content segment. The flow may then proceed to block 305 where the video content segment is played. Next, the flow may proceed to block 306 where the computing device determines whether or not information describing a sequence of which the video content segment is a part indicates that one or more other video content segments are selectable from the video content segment. If so, the flow proceeds to block 309. Otherwise, the flow proceeds to block 307.

At block 307, after the computing device determines that information describing a sequence of which the video content segment is a part does not indicate that one or more other video content segments are selectable from the video content segment, the computing device determines whether or not play of the video content segment is finished. If not, the flow proceeds to block 308 where play of the video content segment continues before the flow returns to block 307 and the computing device again determines whether or not play of the video content segment is finished. Otherwise, the flow returns to block 302 where the computing device continues to operate.

At block 309, after the computing device determines that information describing a sequence of which the video content segment is a part indicates that one or more other video content segments are selectable from the video content segment, the computing device attempts to load the other video content segment(s). The flow then proceeds to block 310.

At block 310, the computing device determines whether or not the other video content segment is selected. If not, the flow proceeds to block 311. Otherwise, the flow returns to block 305 where the other video content segment is played instead of the original video content segment.

At block 311, after the computing device determines that the other video content segment is not selected, the computing device determines whether or not play of the video content segment is finished. If not, the flow proceeds to block 312 where play of the video content segment continues before the flow returns to block 311 and the computing device again determines whether or not play of the video content segment is finished. Otherwise, the flow returns to block 302 where the computing device continues to operate.

Although the method 300 is illustrated and described above as including particular operations performed in a particular order, it is understood that in other implementations other arrangements of the same, similar, and/or different operations may be performed without departing from the scope of the present disclosure. For example, in various implementations, determinations may be made as to whether or not to retain one or more loaded video content segments when play is switched from a first video content segment to a second video content segment.

By way of another example, the method 300 is illustrated and described as attempting to load the video content segment after determining to play the video content segment. However, in various implementations the video content segment may already be loaded when a decision to play the video content segment is made. In such implementations, the already loaded version of the video content segment may be played and a new version of the video content segment may not be loaded.

Figure 4:
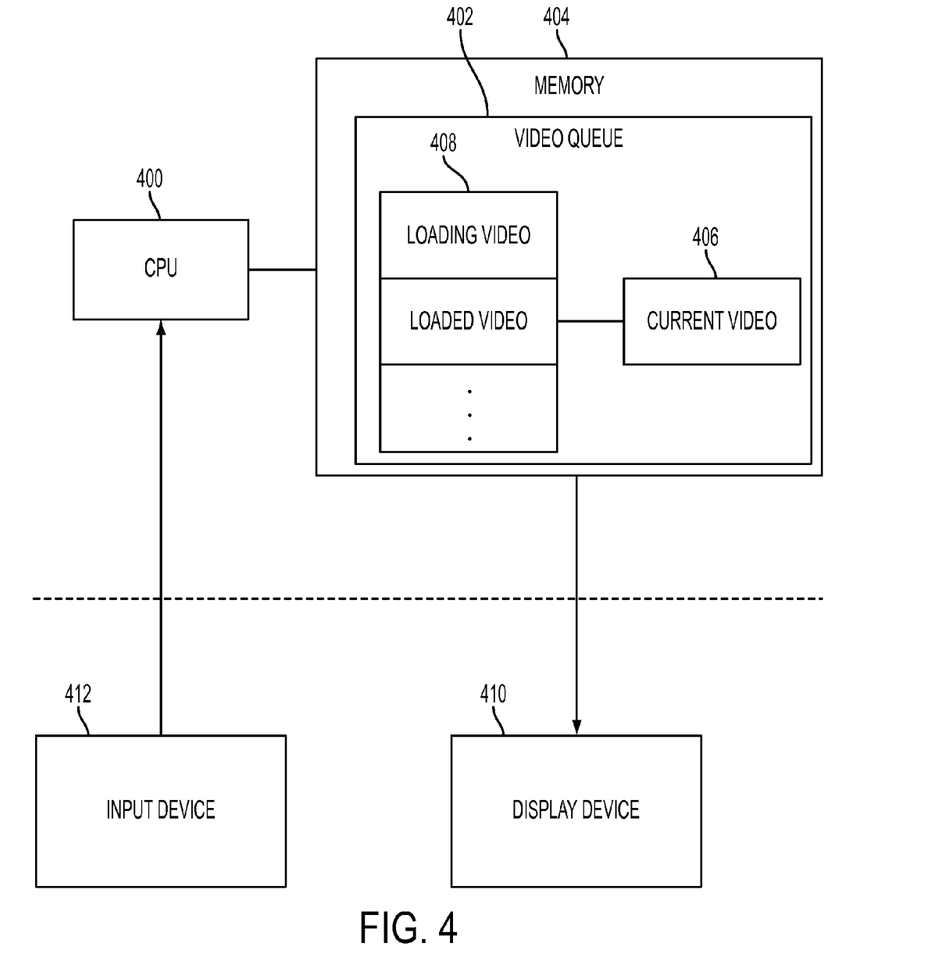
FIG. 4 is a block diagram representation of various example aspects of pre-fetching video content.

In accordance with one or more implementations of the present disclosure, FIG. 4 illustrates an example mechanism by which multiple videos may be loaded fully into memory in preparation for display upon one of several possible user selections at some point in the future. When the player loads, CPU (400) loads a package of several videos (402) into memory (404), including the video that is currently to be shown to the user (406). All videos that may be played substantially immediately upon user selection are loaded into a repository (408) as described below. This repository may include videos in various different states of readiness (fully loaded, currently loading, waiting to load, etc.).

The current video (406) is displayed to the user, and begins playback. During playback, the current video displays various selections the user can make. When the user makes a selection via some input device (412), the CPU (400) then chooses a corresponding video from the repository (408), and loads that as the current video (406). Playback then proceeds with this new video, and the process repeats.

Figure 5:
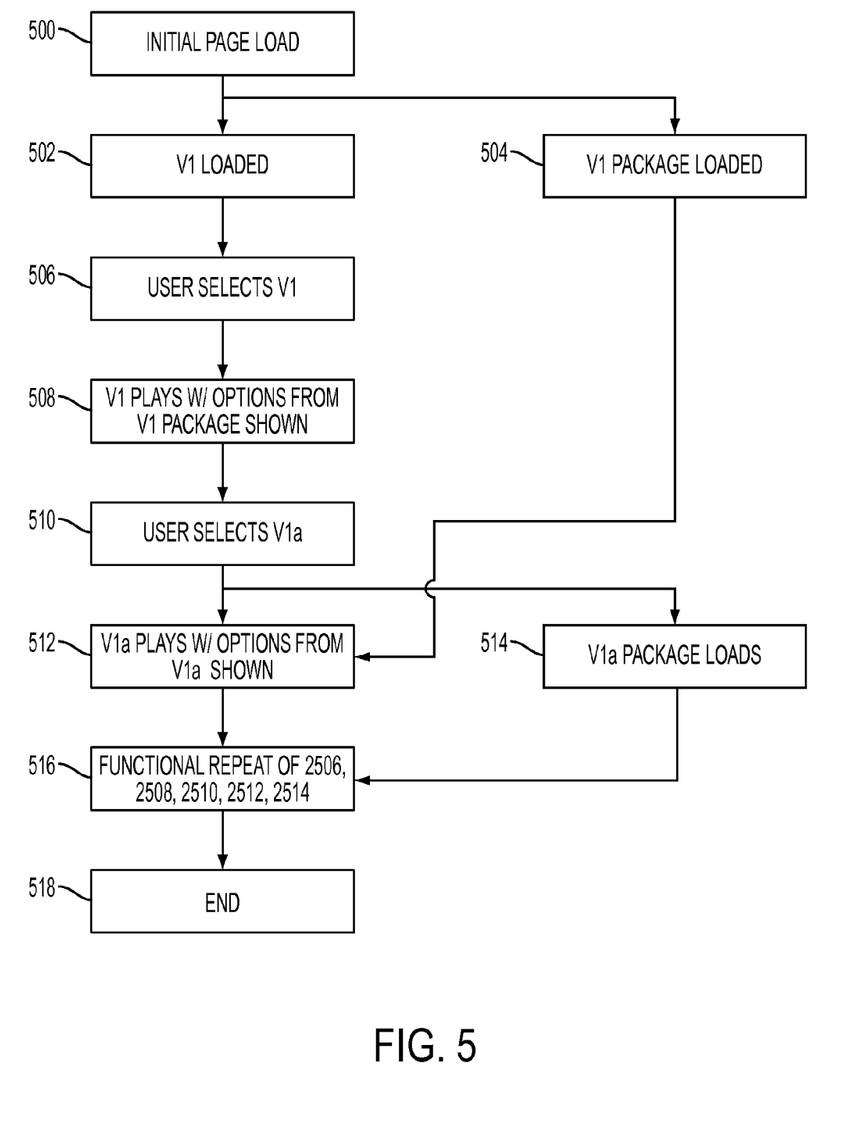
FIG. 5 is a block diagram representation of various example aspects of pre-fetching video content.

In accordance with various implementations of the present disclosure, FIG. 25 illustrates an example process by which videos may be loaded into memory ahead of time. When the player first loads in a web page (500), the player loads the first video to be played (502), here referred to as V1, as well as a package of videos that may be played as a result of some user selection during V1 (504). Once V1 has loaded, a user selection (506) may occur that triggers playback of V1 (508). During this playback, various user selections are presented to the user, which the user may or may not choose to activate.

When a user does activate one of these user selections (510), the player then begins playing a new video (512), here referred to as V1a, as well as a package of videos that may be played as a result of some user selection during V1a (514). This new package of videos may include videos that are already loaded into memory for another package that was previously loaded.

After operation 514, the process from 506, 508, 510, 512, and 514 may continue to repeat (516), until ended by the user, as allowed by the availability of further user selections. In the event that there are no user selections available during a video, or a user stops playback, leaves the web page, or in some other way exits the player, playback ends (518). If playback is ended without exiting the player (such as through no available user selections), then a replay option may be displayed, which begins the playback again, from some video the player has previously displayed to the user.

As used herein, unless defined otherwise, "video" is intended to include a video, an animation, an image, an interactive element, a widget from another website, or a collection of any of these kinds of media to be displayed simultaneously.

As used herein, unless defined otherwise, "user selection" is intended to include manual interaction, automatically generated events, computationally gathered information (such as the user's gender, age, location, or a collected history of user selections), sensor readings (biological, etc.), or the end of a playing video.

In general, displayed user selections for a particular video may be pre-selected as all relevant user selections, or it may be some subset of all relevant user selections depending on various conditions, such as employment status, age range, gender, geographical location, etc., or based on the prior user selections that occurred.

In general, a package of videos that is loaded may be pre-selected as all relevant videos, or it may be some subset of all relevant videos depending on various conditions, such as employment status, age range, gender, geographical location, etc., or based on the prior user selections that occurred.

Figure 6:
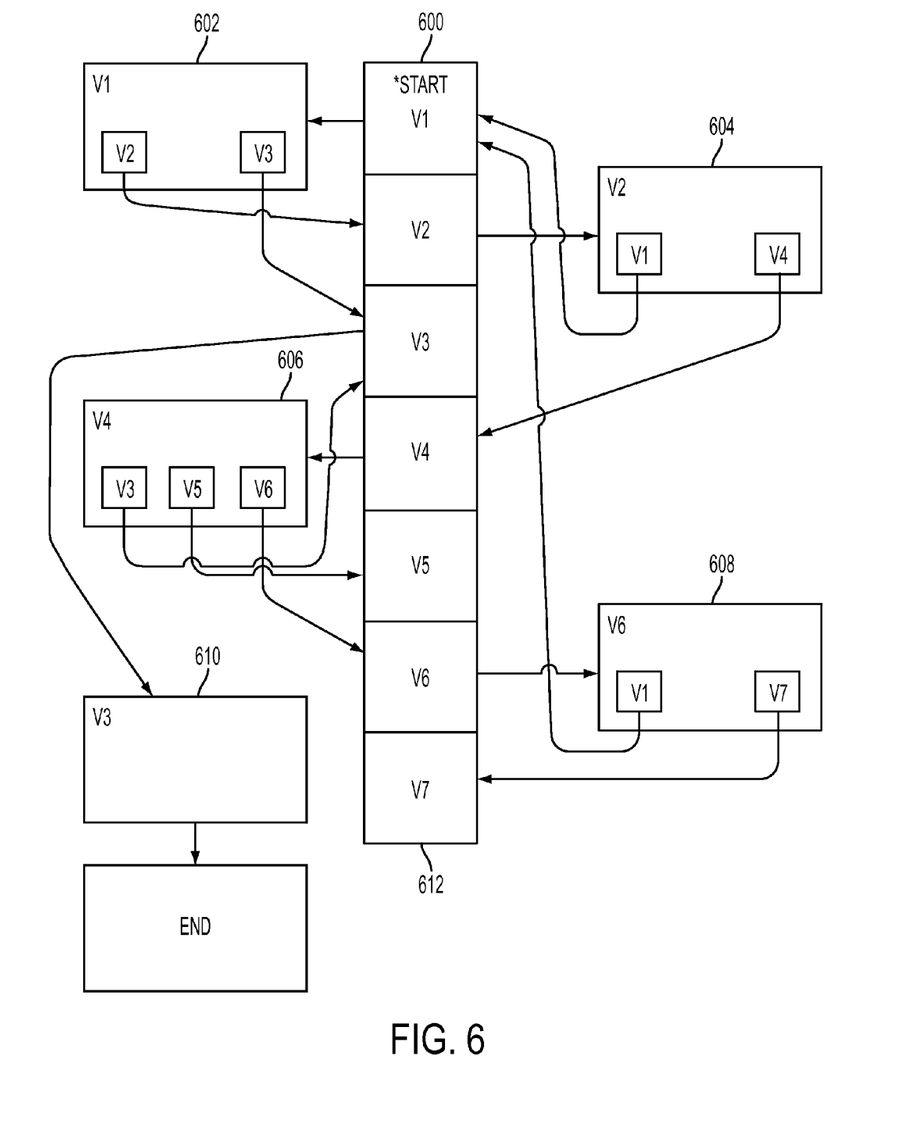
FIG. 6 is a block diagram representation of various example aspects of pre-fetching video content.

In accordance with one or more implementations of the present disclosure, FIG. 26 provides an example flow of a process by which videos may be loaded and played, given a set of possible user selections. When the player first loads, the player loads the first video to play from all possible videos (600), V1. In addition, the player loads the videos that are available from user selections in V1 (602). In this illustration, those videos are V2 and V3. When the user begins playback, these selections are made available, and may or may not be activated.

If, during playback of V1, a user selection is activated that connects to V2, then V2 is played back (604), and the package of videos made available by user selections in V2 are loaded. In this illustration, the user selections available connect to V1 and V4. If V1 is still in memory from the first time it was loaded, then only V4 begins loading. Otherwise, both V1 and V4 begin loading.

During playback of V2, a user selection may be activated that connects to V4. At which point, V4 is played for the user (606). In addition, videos V5 and V6 are loaded as possible videos from user selections in V4. V3 may also be loaded, if it is no longer in memory from the initial load as a possible user selection from V1.

During playback of V4, a user selection may be activated that connects to V6. At which point, V6 is played for the user (608). In addition, video V7 is loaded as a possible video from user selections in V6. V1 may also be loaded again, if it is no longer in memory from either the initial load at the very beginning of playback, or the package loaded for video V2 (604).

During playback of V6, a user selection may be activated that connects back to V1. At which point, V1 is played again for the user (602). In addition, if any of the videos in the package for V1 are no longer in memory, they are once again loaded into memory while V1 plays.

During playback of V1, a user selection may be activated that connects to V3. At which point, V3 is played for the user (610). Since there are no user selections available during playback of V3, when V3 is done playing, playback ends completely (612). At this point, a user selection may be displayed, which plays one of the videos that has been loaded, and begins the process again, from there.

As discussed above and illustrated in the figures, the present disclosure discloses systems, methods, apparatuses, and computer program products for pre-fetching video content. At least one first video content segment may be played. One or more second video content segments that are associated with the first video content segment may be determined. Loading of the one or more second video content segments may be attempted. In this way, play of the video content segments may reduce and/or avoid delays in changing the video content being played.

Although the present disclosure is illustrated and described above as applying to video, in various implementations the techniques discussed herein may be applied to content other than video without departing from the scope of the present disclosure. For example, an interactive audio sequence may include a number of selectable audio segments, one or more of which may include portions where other audio segments in the sequence may be selected. In this example, the techniques of the present disclosure may be utilized to pre-fetch various of the audio segments during play of one or more of the other audio segments.

In one or more implementations, an apparatus may include a processor and a machine-readable storage medium communicatively coupled to the processor that stores a first computer-executable code that, when executed by the processor, instructs the apparatus to perform the operations of: loading a first video into the storage medium; loading a video package into the storage medium, the video package including a number of videos associated with the first video; and concurrently with loading the video package, outputting the first video for display on a display device, the first video having a selectable icon for each video in the video package.

In some cases, the operations executed by the first computer-executable code further include: receiving an input from an input device communicatively coupled to the processor, the input selecting an icon associated with a second video; and outputting the second video from the storage medium for display on the display device. In such cases, the second video may be associated with a second video package that includes a number of videos and the operations executed by the first computer-executable code may include concurrently with outputting the second video, loading the second video package into the storage medium. Further, the operation of loading the second video package into the storage medium may include: for each video in the second video package, determining if the video is currently stored in the storage medium; if the video is not currently stored in the storage medium, loading the video into the storage medium; and if the video is currently stored in the storage medium, taking no further action to acquire the video.

In various cases, the operations executed by the first computer-executable code may further include: determining a network address for each video in the video package; and loading each video from a network node specified by its network address. In such cases, the video package may include two videos that are loaded from different network nodes.

In some cases, the operations executed by the first computer-executable code may include loading a user profile into the storage device. In such cases, the operation of loading the video package into the storage medium may include only loading those videos that are consistent with the user profile.

In various implementations, a machine-readable storage medium may store a first computer-executable code that, when executed by a processor, instructs an apparatus to perform the operations of: loading a first video into the storage medium; loading a video package into the storage medium, the video package including a number of videos associated with the first video; and concurrently with loading the video package, outputting the first video for display on a display device, the first video having a selectable icon for each video in the video package. In some cases, the operations executed by the first computer-executable code may further include: receiving an input from an input device, the input selecting an icon associated with a second video; and outputting the second video from the storage medium for display on the display device. In such cases, the second video may be associated with a second video package that includes a number of videos and the operations executed by the first computer-executable code may further include concurrently with outputting the second video, loading the second video package into the storage medium.

In some implementations, a computer-implemented method may include: loading a first video into a storage medium; loading a video package into the storage medium, the video package including a number of videos associated with the first video; and concurrently with loading the video package, outputting the first video for display on a display device, the first video having a selectable icon for each video in the video package. The computer-implemented method may also include receiving an input from an input device, the input selecting an icon associated with a second video; and outputting the second video from the storage medium for display on the display device. In some cases, the computer-implemented method may further include concurrently with outputting the second video, loading the second video package into the storage medium.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for pre-fetching video content, comprising:
   at least one processing unit; and
   at least one non-transitory storage medium storing instructions;
   wherein the at least one processing unit executes the instructions to:
   play at least one first video content segment, the first video content segment being a member of a set of video content segments that together define an interactive video, the interactive video including a predetermined information structure that defines relationships between the video content segments of the interactive video including, for each particular video content segment in the set of video content segments, a subset of video content segments that are selectable from the particular video content segment through a selection mechanism that is presented and enabled at a particular point during a display of the particular video content segment, wherein the relationships defined by the information structure are independent of user selections made through the selection mechanism;
   determine, based on the predetermined information structure, at least one second video content segment is associated with the at least one first video content segment, the at least one second video content segment being a member of the set of video content segments that together define the interactive video;

determine, based on the predetermined information structure, that the at least one second video is a member of the subset of video content segments that are selectable from the first video content segment through the selection mechanism; and in response to determining that the at least one second video is selectable from the first video content segment, attempt to load the at least one second video content segment during play of the first video content segment.

2. The system of claim 1, wherein the at least one processing unit determines the at least one second video content segment is associated with the at least one first video content segment by analyzing information that describes the interactive video content sequence.

3. The system of claim 2, wherein the information is at least one of:
separate from the at least one first video content segment and the at least one second video content segment; or
embedded in the at least one first video content segment.

4. The system of claim 1, wherein the at least one second video content segment comprises a plurality of video content segments that are each associated with the at least one first video content segment.

5. The system of claim 4, wherein the at least one processing unit attempts to load the plurality of video content segments according to a priority scheme.

6. The system of claim 5, wherein the priority scheme specifies to load a first of the plurality of video content segments before loading a second of the plurality of video content segments.

7. The system of claim 5, wherein the priority scheme specifies to give preference to loading of a first of the plurality of video content segments over loading of a second of the plurality of video content segments.

8. The system of claim 4, wherein the priority scheme is at least based on at least one of:
statistical information regarding selection of at least one of the plurality of video content segments;
a size of at least one of the plurality of video content segments; or
an estimated load time of at least one of the plurality of video content segments.

9. The system of claim 4, wherein the processing unit further:
plays a first video content segment of the plurality of video content segments; and
determines whether to retain other video content segments of the plurality of video content segments.

10. The system of claim 9, wherein the processing unit determines to retain at least a first of the other video content segments because the first of the other video content segments is fully loaded.

11. The system of claim 9, wherein the processing unit determines not to retain at least a first of the other video content segments because at least one of:
the first of the other video content segments is not fully loaded;
available storage for video content segments is below a threshold; or
the first of the other video content segments is not selectable from the first video content segment of the plurality of video content segments.

12. The system of claim 9, wherein the at least one processing unit:

determines not to retain at least a first of the other video content segments that is not fully loaded; and
ceases loading the first of the other video content segments.

13. The system of claim 4, wherein the plurality of video content segments are each associated with the at least one first video content segment because each of the plurality of video content segments are selectable from at least one of the at least one first video content segment or at least one other of the plurality of video content segments.

14. The system of claim 4, wherein the plurality of video content segments are a subset of video content segments that are associated with the at least one first video content segment and the processing unit selects the plurality of video content segments as the subset based at least on:
available storage;
available communication bandwidth;
statistical information regarding selection of at least one of the video content segments.

15. The system of claim 1, wherein attempting to load the at least one second video content segment comprises attempting to move the at least one second video content segment into a cache.

16. The system of claim 1, further comprising playing the at least one second video content after selecting the at least one second video content from the at least one first video content for loading, wherein the at least one second video content segment is associated with the at least one first video content segment because the at least one second video content segment is selectable from the at least one first video content segment.

17. The system of claim 1, wherein the processing unit further:
plays the at least one second video content segment;
determines at least one third video content segment is associated with the at least one second video content segment; and
attempts to load the at least one third video content segment.

18. A method for pre-fetching video content, comprising:
playing at least one first video content segment utilizing at least one processing unit, the first video content segment being a member of a set of video content segments that together define an interactive video content sequence, the interactive video content sequence including a predetermined information structure that defines relationships between the video content segments of the interactive video including, for each particular video content segment in the set of video content segments, a subset of video content segments that are selectable from the particular video content segment through a selection mechanism that is presented and enabled at a particular point during a display of the particular video content segment, wherein the relationships defined by the information structure are independent of user selections made through the selection mechanism;

determining, based on the predetermined information structure and utilizing the at least one processing unit, at least one second video content segment is associated with the at least one first video content segment, the at least one second video content segment being a member of the set of video content segments that together define the interactive video;

determining, based on the predetermined information structure and utilizing the at least one processing unit, that the at least one second video is a member of the subset of video content segments that are selectable from the first video content segment through the selection mechanism; and in response to determining that the at least one second video is selectable from the at least one first video, attempting to load the at least one second video content segment utilizing the at least one processing unit during play of the first video content segment.

19. The system of claim 1, wherein the processing unit attempts to load the at least one second video content segment before the at least one second video is selected through the selection mechanism.

20. A computer program product, comprising:

a first set of instructions, stored in at least one non-transitory storage medium, executable by at least one processing unit to play at least one first video content segment, the first video content segment being a member of a set of video content segments that together define an interactive video content sequence, the interactive video content sequence including a predetermined information structure that defines relationships between the video content segments of the interactive video including, for each particular video content segment in the set of video content segments, a subset of video content segments that are selectable from the particular video content segment through a selection mechanism that is presented and enabled at a particular point during a display of the particular video content segment, wherein the relationships defined by the information structure are independent of user selections made through the selection mechanism;

a second set of instructions, stored in the at least one non-transitory storage medium, executable by the at least one processing unit to determine, based on the predetermined information structure, at least one second video content segment is associated with the at least one first video content segment, the at least one second video content segment being a member of the set of video content segments that together define the interactive video a third set of instructions, stored in the at least one non-transitory storage medium, executable by the at least one processing unit to determine, based on the predetermined information structure, that the at least one second video is a member of the subset of video content segments that are selectable from the first video content segment through the selection mechanism; and a fourth set of instructions, stored in the at least one non-transitory storage medium, executable by the at least one processing unit to attempt to load the at least one second video content segment in response to determining that the at least one second video is selectable from the at least one first video during play of the first video content segment.

* * * * *